(No Model.)
E. FILI, Jr.
SLAB OILER OR GREASER FOR CONFECTIONERS.
No. 595,910.  Patented Dec. 21, 1897.
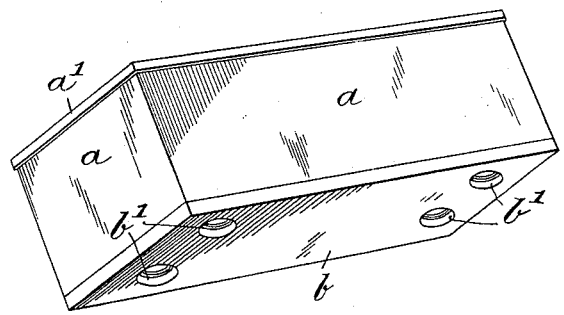
Fig. 1.
Fig. 2.
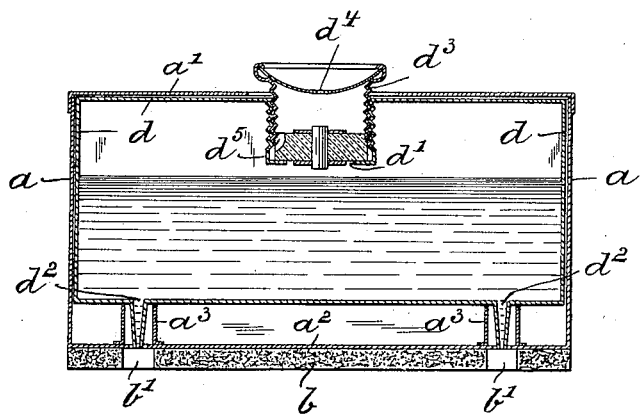
Fig. 3.
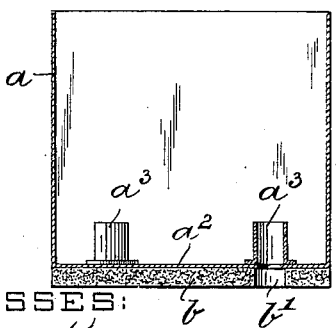
Fig. 4.
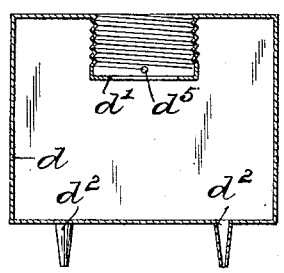
WITNESSES:
Minna Kisel
Henry F. Kisel
INVENTOR:
Ernst Fili Jr.
BY George C. Kisel
ATTORNEY.
THE NORRIS PETERS CO., PHOTO-LITHO., WASHINGTON, D. C.

UNITED STATES PATENT OFFICE.

ERNST FILI, JR., OF PHILADELPHIA, PENNSYLVANIA.

SLAB OILER OR GREASER FOR CONFECTIONERS.

SPECIFICATION forming part of Letters Patent No. 595,910, dated December 21, 1897.

Application filed May 20, 1897. Serial No. 637,474. (No model.)

*To all whom it may concern:*

Be it known that I, ERNST FILI, Jr., a citizen of the United States, residing at Philadelphia, in the county of Philadelphia and State of Pennsylvania, have invented certain new and useful Improvements in Slab Oilers or Greasers for Confectioners, of which the following is a specification.

My invention relates to an oiler or greaser for marble slabs for the use of confectioners and the like; and it has for its object an oiling device of simple construction, efficient in operation, which may be used economically and with the saving of time, and which is from a sanitary point of view cleanly.

To this end my invention consists of an outer casing having at its bottom a layer of felt or similar absorbent material and provided with one or more outlets traversing the felt and an inner closed receptacle within which the oil is placed, said receptacle having one or more discharge openings or ducts leading to and partially traversing the outlet or outlets through the absorbent material.

My invention also consists of the combination and arrangement of parts in an oil or grease distributer, substantially as hereinafter described and claimed.

My invention is illustrated in the accompanying drawings, similar parts throughout the several views being indicated by similar letters, and in which—

Figure 1 is a perspective view of the device. Fig. 2 is a central longitudinal section of the same. Fig. 3 is a transverse sectional view of the outer casing, the felt bottom, and the outlets; and Fig. 4 is a central cross-section of the inner receptacle and its discharge openings or ducts.

Referring to the drawings, $a$ represents the outer casing, preferably box shape and having by preference a lid $a'$. The bottom $a^2$ of this casing is covered by a layer of felt or other absorbent $b$, and extending upward in the casing $a$ is a series of one or more outlets $a^3$, consisting by preference of short cylindrical tubes. The felt $b$ is also perforated or cut away, as at $b'$, immediately below the lower openings in these tubes $a^3$, as clearly shown in Figs. 1, 2, and 3. Within this casing $a$ is placed an inner receptacle $d$, in which the oil or grease is stored, and this receptacle $d$ is closed except at the upper inlet-opening $d'$, and a series of one or more lower discharge-openings $d^2$, which by preference consist of conical or tapered tubes or ducts adapted to enter and partially traverse the outlets $a^3$, substantially as shown in Fig. 2. The inlet-opening $d'$ is normally closed by a cap $d^3$, having an air-inlet $d^4$ communicating with a small perforation $d^5$ in the inlet $d'$, as shown in Figs. 2 and 4. The inner receptacle $d$ is supported on the outlet-tubes $a^3$.

In operation oil is placed in the receptacle $d$ through the opening $d'$, after which the cap $d^3$ is screwed down in said opening $d'$, so as to prevent the escape of the oil, but still permit of the entrance of a small quantity of air. The receptacle is now placed within the casing $a$ and the lid $a'$ thereof placed in position. When now the casing $a$ and its contained receptacle $d$ are moved or slid over a marble slab or similar article to be greased or oiled, the motion imparted to the oil in the receptacle $d$ will cause it to escape more or less rapidly through the conical ducts $d^2$ into the outlet-openings $a^3$ and through the felt $b$ on the bottom of the casing $a$. In its passage through the felt $b$ the oil is partially absorbed by the felt, so that only some of the oil is communicated to the slab direct, while the other portion first saturates the felt before it is rubbed upon the slab. By a more vigorous movement imparted to the casing more oil will be discharged to the slab and felt, and a slower movement of the casing will result in a smaller discharge to the slab and felt, so that the device is constantly under the control of the workman.

To those familiar with the greasing or oiling of slabs as now practiced the novelty and utility of my device will be apparent. No one who has seen the slab oiled with a rag dipped in grease or oil or with a brush from which the oil is spattered or irregularly distributed upon the slab can fail to appreciate the advantages of my invention, which, briefly stated, are the saving of time and oil, the cleanliness of the oiler and of the person performing the operation, and particularly the spreading of the oil upon the slab in a layer or film of required thinness, thus lessening the liability of damaging the taste of the candy, which results from a too liberal application of the oil to the slab.

Having thus described the nature and objects of my invention, what I claim as new, and desire to secure by Letters Patent, is—

1. In a device of the character described, the combination of the outer casing having one or more outlet-openings, a layer of absorbent material secured to the bottom of said casing and perforated at the outlet-openings in said casing, and a receptacle adapted to receive the oil placed within the casing and having one or more discharge-outlets registering with the outlet-openings of the casing, substantially as described.

2. In a device of the character described, the combination of the outer casing, a series of tubes projecting upward into the outer casing to constitute outlets therefor, a receptacle adapted to receive oil and placed within the casing, a series of conical ducts or outlets projecting from the bottom of the receptacle and adapted to traverse the tubes thereof, and a layer of felt or similar absorbent material secured to the bottom of the casing and having a series of openings registering with the outlets from said casing, substantially as and for the purposes described.

ERNST FILI, JR.

Witnesses:
HENRY F. KÜSEL,
WM. F. PADDOCK.